US012626190B2

(12) United States Patent
Kim et al.

(10) Patent No.: US 12,626,190 B2
(45) Date of Patent: May 12, 2026

(54) METHOD OF ANALYZING WIRELESS SIGNALS USING MULTI-TASK LEARNING-BASED SPECTRAL ANALYSIS LEARNING MODEL

(71) Applicant: Korea University of Technology and Education Industry—University Cooperation Foundation, Cheonan-si (KR)

(72) Inventors: Won Tae Kim, Cheonan-si (KR); Han Jin Kim, Cheongju-si (KR); Young Jin Kim, Cheongju-si (KR)

(73) Assignee: Korea University of Technology and Education Industry-University Cooperation Foundation, Cheonan-si (KR)

( * ) Notice: Subject to any disclaimer, the term of this patent is extended or adjusted under 35 U.S.C. 154(b) by 680 days.

(21) Appl. No.: 18/077,206

(22) Filed: Dec. 7, 2022

(65) Prior Publication Data

US 2024/0104428 A1 Mar. 28, 2024

(30) Foreign Application Priority Data

Sep. 27, 2022 (KR) ........................ 10-2022-0122762

(51) Int. Cl.
*G06N 20/00* (2019.01)
*H04B 17/30* (2015.01)

(52) U.S. Cl.
CPC ............. *G06N 20/00* (2019.01); *H04B 17/30* (2015.01)

(58) Field of Classification Search
CPC .......... G06N 20/00; G06N 3/045; G06N 3/08; H04B 17/30
See application file for complete search history.

(56) References Cited

U.S. PATENT DOCUMENTS

2011/0275938 A1* 11/2011 Kim ........................ A61B 8/488
2021/0211212 A1* 7/2021 Derr ........................ H04B 17/10
(Continued)

FOREIGN PATENT DOCUMENTS

WO 2022104340 A1 5/2022

OTHER PUBLICATIONS

Kulin, et al., "End-to-end learning from spectrum data: A deep learning approach for wireless signal identification in spectrum monitoring applications." (Year: 2018).*
(Continued)

*Primary Examiner* — Michelle T Bechtold
*Assistant Examiner* — Matiyas T Maru
(74) *Attorney, Agent, or Firm* — STIP Law Group, LLC

(57) ABSTRACT

A wireless signal spectral analysis method using a multi-task learning-based spectral analysis learning model, the wireless signal spectral analysis method may be provided. The analysis method according to an embodiment of the present disclosure may include: receiving a target signal of a target band, obtaining a training dataset through pre-processing of the target signal, performing wireless signal spectral analysis learning using the training dataset, and analyzing the target signal using a trained spectral analysis learning model, wherein the performing of wireless signal spectral analysis learning comprises: configuring task specific layers for respectively performing individual learning for a plurality of tasks to be analyzed and a shared layer for performing shared learning; learning, in the shared layer, correlation data that meets a predefined criterion in the training dataset; and individually learning, in each of the plurality of task specific layers, using an individual dataset required for each task in the training dataset and a result of learning the correlation data.

7 Claims, 13 Drawing Sheets

(A) Wireless LAN (B) Zigbee (C) Bluetooth

(56) References Cited

U.S. PATENT DOCUMENTS

| | | | |
|---|---|---|---|
| 2021/0374542 A1* | 12/2021 | Zhang | G06F 8/65 |
| 2022/0012913 A1* | 1/2022 | Thomas | G06T 7/75 |
| 2022/0299593 A1* | 9/2022 | Abir | G08G 1/005 |
| 2022/0375259 A1* | 11/2022 | Banerjee | G06V 40/171 |

OTHER PUBLICATIONS

Wang, et al., "Understanding and modeling of wifi signal based human activity recognition.", (Year: 2015).*

Crawshaw et al., "Multi-task learning with deep neural networks: A survey." (Year: 2020).*

Michael Crawshaw, Multi-Task Learning With Deep Neural Networks: A Survey, 2020, arXiv preprint arXiv:2009.09796.

\* cited by examiner (A) Wireless LAN (B) Zigbee (C) Bluetooth

FIG. 3
(A)
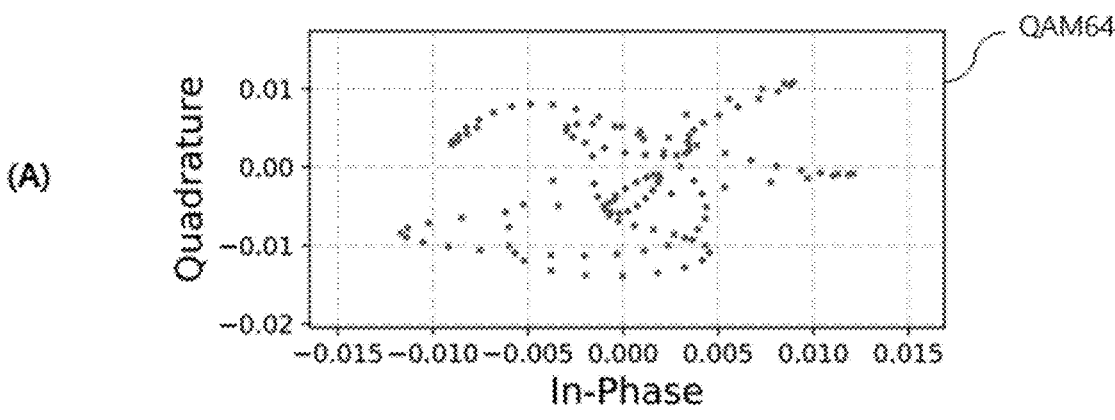
(B)
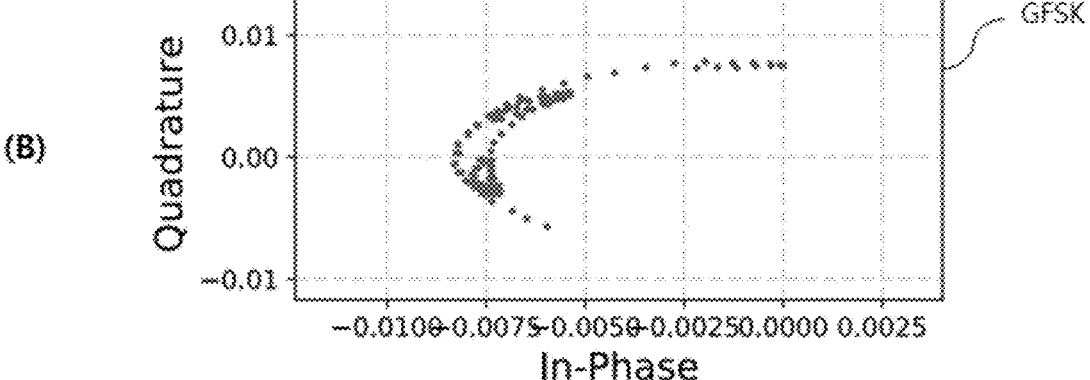

FIG. 4
(A)
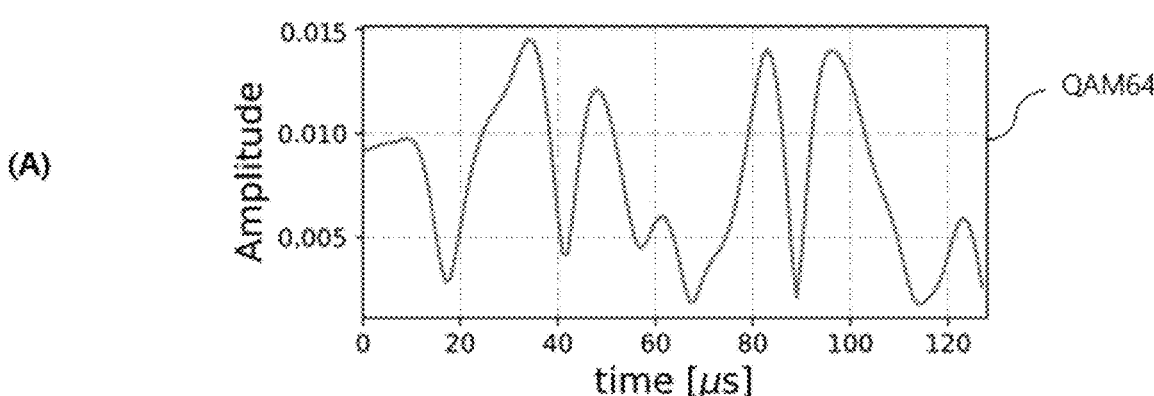
(B)
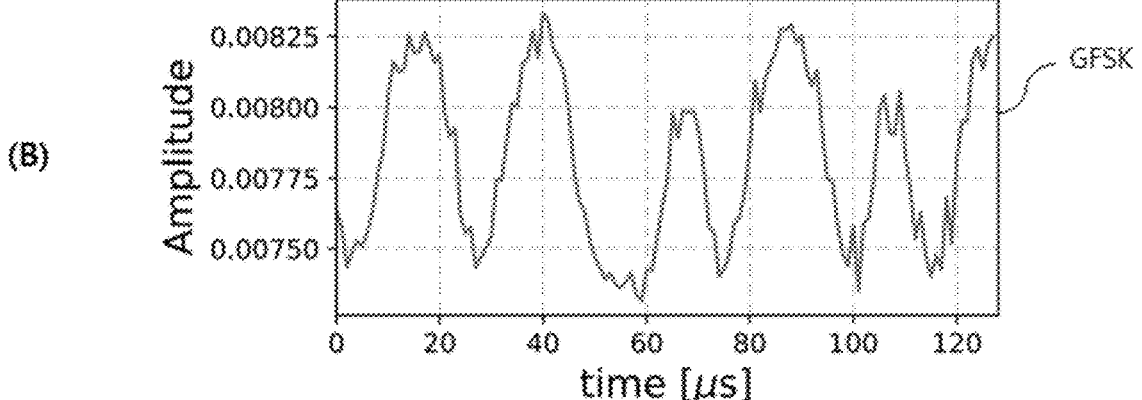

FIG. 5
(A)
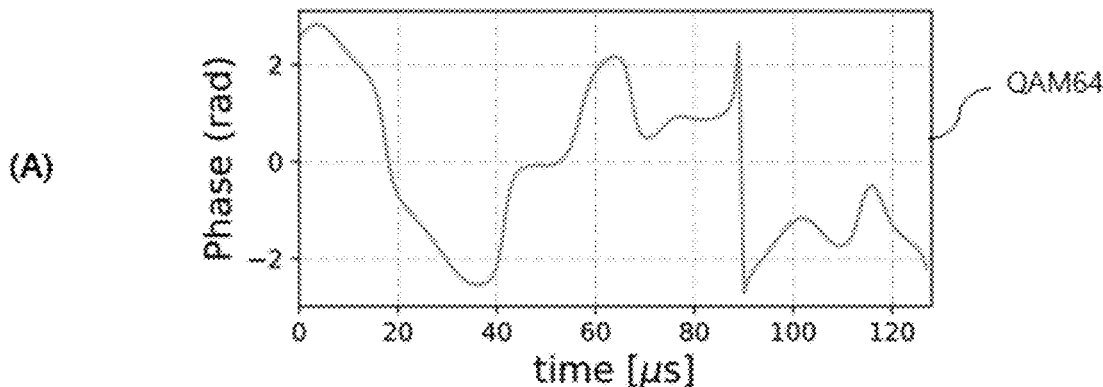
(B)
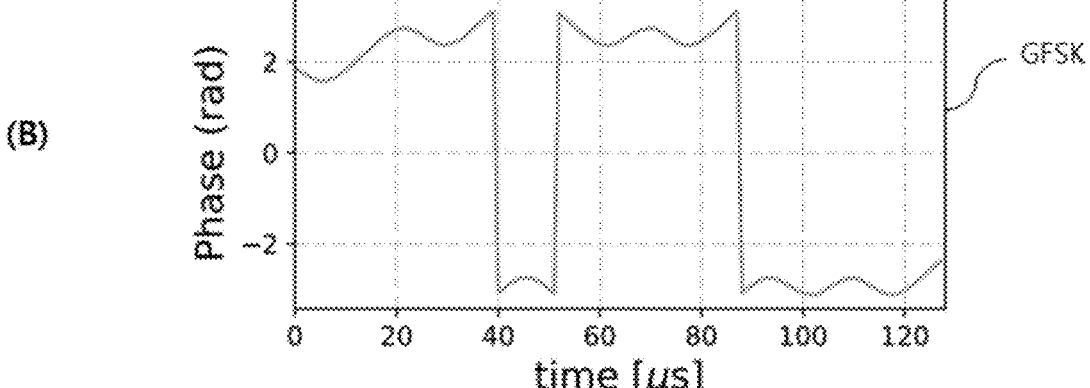

TASK TO BE LEARNED AND ANALYZED IS CONFIGURED    S5100

SHARED LAYER AND TASK SPECIFIC LAYER ARE CONFIGURED    S5300

CORRELATION DATA LEARNING IS PERFORMED    S5500

LEARNING ON AN INDIVIDUAL TASK IS PERFORMED    S5700

FIG. 12

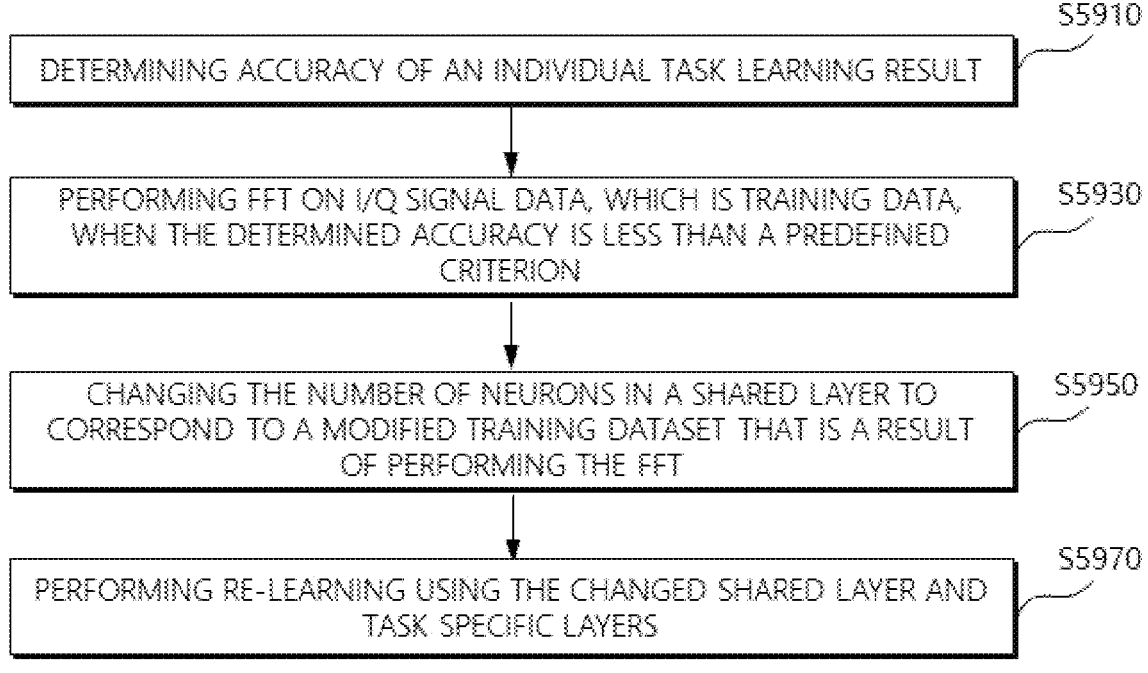

S5910
DETERMINING ACCURACY OF AN INDIVIDUAL TASK LEARNING RESULT

S5930
PERFORMING FFT ON I/Q SIGNAL DATA, WHICH IS TRAINING DATA, WHEN THE DETERMINED ACCURACY IS LESS THAN A PREDEFINED CRITERION

S5950
CHANGING THE NUMBER OF NEURONS IN A SHARED LAYER TO CORRESPOND TO A MODIFIED TRAINING DATASET THAT IS A RESULT OF PERFORMING THE FFT

S5970
PERFORMING RE-LEARNING USING THE CHANGED SHARED LAYER AND TASK SPECIFIC LAYERS

FIG. 13

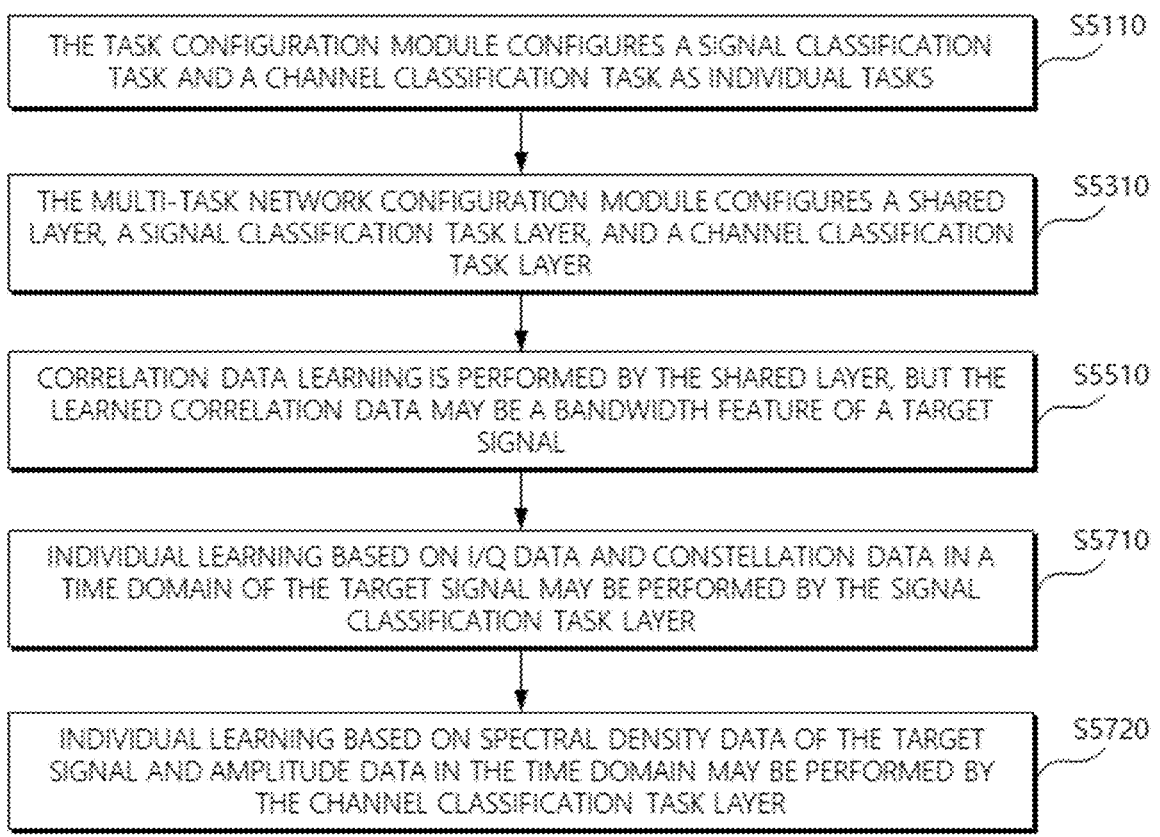

THE TASK CONFIGURATION MODULE CONFIGURES A SIGNAL CLASSIFICATION TASK AND A CHANNEL CLASSIFICATION TASK AS INDIVIDUAL TASKS — S5110

THE MULTI-TASK NETWORK CONFIGURATION MODULE CONFIGURES A SHARED LAYER, A SIGNAL CLASSIFICATION TASK LAYER, AND A CHANNEL CLASSIFICATION TASK LAYER — S5310

CORRELATION DATA LEARNING IS PERFORMED BY THE SHARED LAYER, BUT THE LEARNED CORRELATION DATA MAY BE A BANDWIDTH FEATURE OF A TARGET SIGNAL — S5510

INDIVIDUAL LEARNING BASED ON I/Q DATA AND CONSTELLATION DATA IN A TIME DOMAIN OF THE TARGET SIGNAL MAY BE PERFORMED BY THE SIGNAL CLASSIFICATION TASK LAYER — S5710

INDIVIDUAL LEARNING BASED ON SPECTRAL DENSITY DATA OF THE TARGET SIGNAL AND AMPLITUDE DATA IN THE TIME DOMAIN MAY BE PERFORMED BY THE CHANNEL CLASSIFICATION TASK LAYER — S5720

METHOD OF ANALYZING WIRELESS SIGNALS USING MULTI-TASK LEARNING-BASED SPECTRAL ANALYSIS LEARNING MODEL

CROSS-REFERENCE TO RELATED APPLICATIONS

This application claims the priority of the Korean Patent Applications NO 10-2022-0122762 filed on Sep. 27, 2022, in the Korean Intellectual Property Office, the disclosure of which is incorporated herein by reference.

BACKGROUND

1. Field

The present disclosure relates to a method of analyzing a spectrum of a wireless signal, and more particularly, to a method of learning spectral analysis of a wireless signal using multi-task learning, and analyzing a wireless signal using the spectral analysis.

2. Description of the Related Art

With the recent rapid development of wireless communication and semiconductors, wireless communication technology has been applied not only to existing wireless communication devices such as smartphones and tablets, but also to home appliances, vehicles, and public facilities. Accordingly, the trend of coexistence of various wireless communication technologies within the same network and spectral band is accelerating.

As the number of devices using various wireless communication technologies increases, the possibility that interference and influence between devices frequently occurs in a multi-dimensional spectral space rather than a one-dimensional space is increasing.

Wireless communication technologies are different from each other in a modulation method, frequency band, band and bandwidth, maximum power, data rate, and transmission range used. For example, as shown in FIG. 1, different wireless communication technologies have different bands and bandwidths. In addition, as shown in FIGS. 2 to 6, different wireless communication technologies have different features (I/Q signal pattern, constellation pattern, amplitude/phase pattern, magnitude pattern in a frequency domain, etc.) according to modulation methods.

A signal using a specific wireless communication technology leaves a footprint for the above features, and when the footprint of the signal is analyzed in an n-dimensional space, a path in which interference of wireless signals can be minimized and collision can be prevented may be selected.

Existing spectrum sensing technologies (hole detection, energy detection, preamble detection, etc.) for preventing the interference and collision support signal classification in a one-dimensional space or merely classify signals, and there is a limit to efficient path determination through spectral analysis in a multi-dimensional space.

DESCRIPTION OF EMBODIMENTS

Technical Problem

Provided are apparatuses and methods of analyzing a signal source in a multi-dimensional spectral space and performing learning on a footprint.

Provided are apparatuses and methods capable of minimizing interference and collision of wireless communication signals by comprehensively learning and analyzing multi-dimensional spatial information.

The technical problems of the present disclosure are not limited to the technical problems mentioned above, and other technical problems that are not mentioned can be clearly understood by one of ordinary skill in the art from the following description.

Technical Solution

As an embodiment of the present disclosure, a wireless signal spectral analysis method using a multi-task learning-based spectral analysis learning model, the wireless signal spectral analysis method may be provided.

The method according to an embodiment of the present disclosure may include: receiving a target signal of a target band, obtaining a training dataset through pre-processing of the target signal, performing wireless signal spectral analysis learning using the training dataset, and analyzing the target signal using a trained spectral analysis learning model, wherein the performing of wireless signal spectral analysis learning comprises: configuring task specific layers for respectively performing individual learning for a plurality of tasks to be analyzed and a shared layer for performing shared learning; learning, in the shared layer, correlation data that meets a predefined criterion in the training dataset; and individually learning, in each of the plurality of task specific layers, using an individual dataset required for each task in the training dataset and a result of learning the correlation data.

The training dataset according to an embodiment of the present disclosure may composed of I/Q signal data, and the performing of the wireless signal spectral analysis learning may comprise: determining accuracy of the individual learning; obtaining a modified training dataset by performing Fast Fourier Transform (FFT) on the I/Q signal data when the accuracy is less than a predefined accuracy criterion; and performing the wireless signal spectral analysis learning using the modified training dataset.

The performing of the wireless signal spectral analysis learning according to an embodiment of the present disclosure may comprise: changing the number of neurons in the shared layer to correspond to the modified training dataset; and performing learning using the changed shared layer and the plurality of task specific layers.

The task specific layer according to an embodiment of the present disclosure may comprise a signal classification task layer configured to classify signals of the target signal and a channel classification task layer configured to classify channels of the target signal, wherein the signal classification task layer performs individual learning based on I/Q data and constellation data in a time domain of the target signal, and the channel classification task layer performs individual learning based on spectral density data of the target signal and amplitude data in the time domain.

The correlation data learned by the shared layer according to an embodiment of the present disclosure may comprise a bandwidth feature of the target signal.

The task specific layer according to an embodiment of the present disclosure may comprise a signal classification task layer configured to classify signals of the target signal and a power estimation task layer configured to estimate power of the target signal, wherein the signal classification task layer performs individual learning based on I/Q data and constellation data in a time domain of the target signal, and the power estimation task layer performs individual learning based on at least one of spectral density data of the target signal, and amplitude and phase data in the time domain.

The correlation data learned by the shared layer according to an embodiment of the present disclosure may comprise at least one of a bandwidth feature, a channel feature, and an I/Q feature of the target signal.

BRIEF DESCRIPTION OF DRAWINGS

FIG. 3 is a view for illustratively explaining a constellation diagram pattern that appears differently depending on a modulation method.

FIG. 4 is a view for exemplarily explaining an amplitude pattern in a time domain that appears differently depending on a modulation method.

FIG. 5 is a view for illustratively explaining a phase pattern in a time domain that appears differently depending on a modulation method.

FIG. 12 is a view for explaining an operation of performing re-learning using a modified training dataset according to learning accuracy, according to some embodiments.

FIG. 13 and FIG. 14 are views for explaining a learning operation for signal classification and channel classification tasks, according to some embodiments.

DETAILED DESCRIPTION

Hereinafter, embodiments of the present invention will be described with reference to the drawings. In the following description, descriptions of a well-known technical configuration in relation to a lead implantation system for a deep brain stimulator will be omitted. For example, descriptions of the configuration/structure/method of a device or system commonly used in deep brain stimulation, such as the structure of an implantable pulse generator, a connection structure/method of the implantable pulse generator and a lead, and a process for transmitting and receiving electrical signals measured through the lead with an external device, will be omitted. Even if these descriptions are omitted, one of ordinary skill in the art will be able to easily understand the characteristic configuration of the present invention through the following description.

Figure 1:
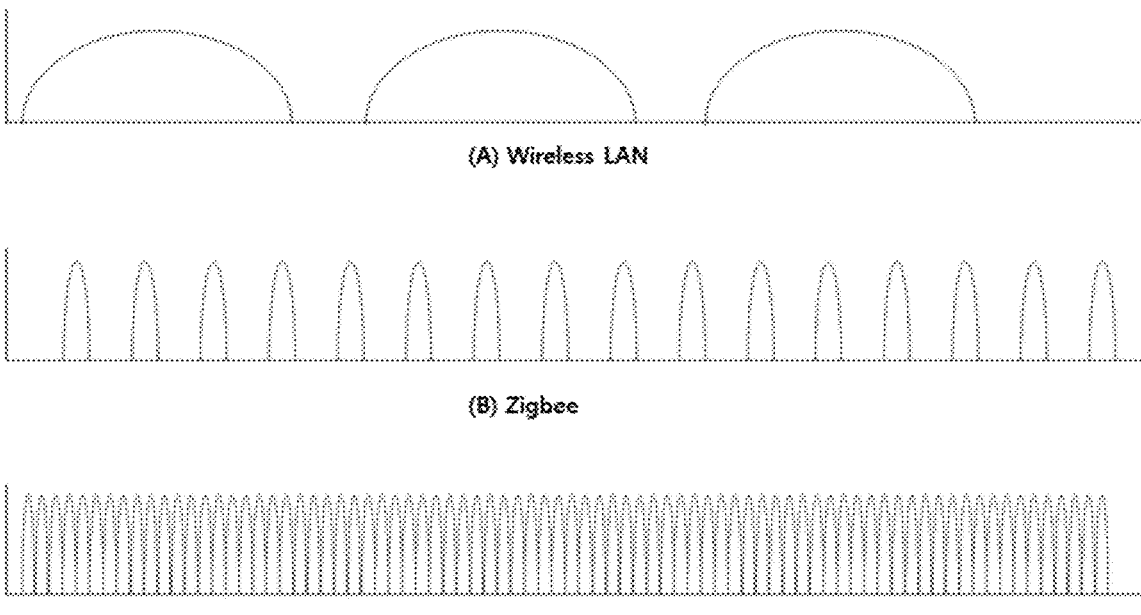
FIG. 1 is a view for illustratively explaining a difference in bandwidth according to the type of a wireless signal.
Figure 2:
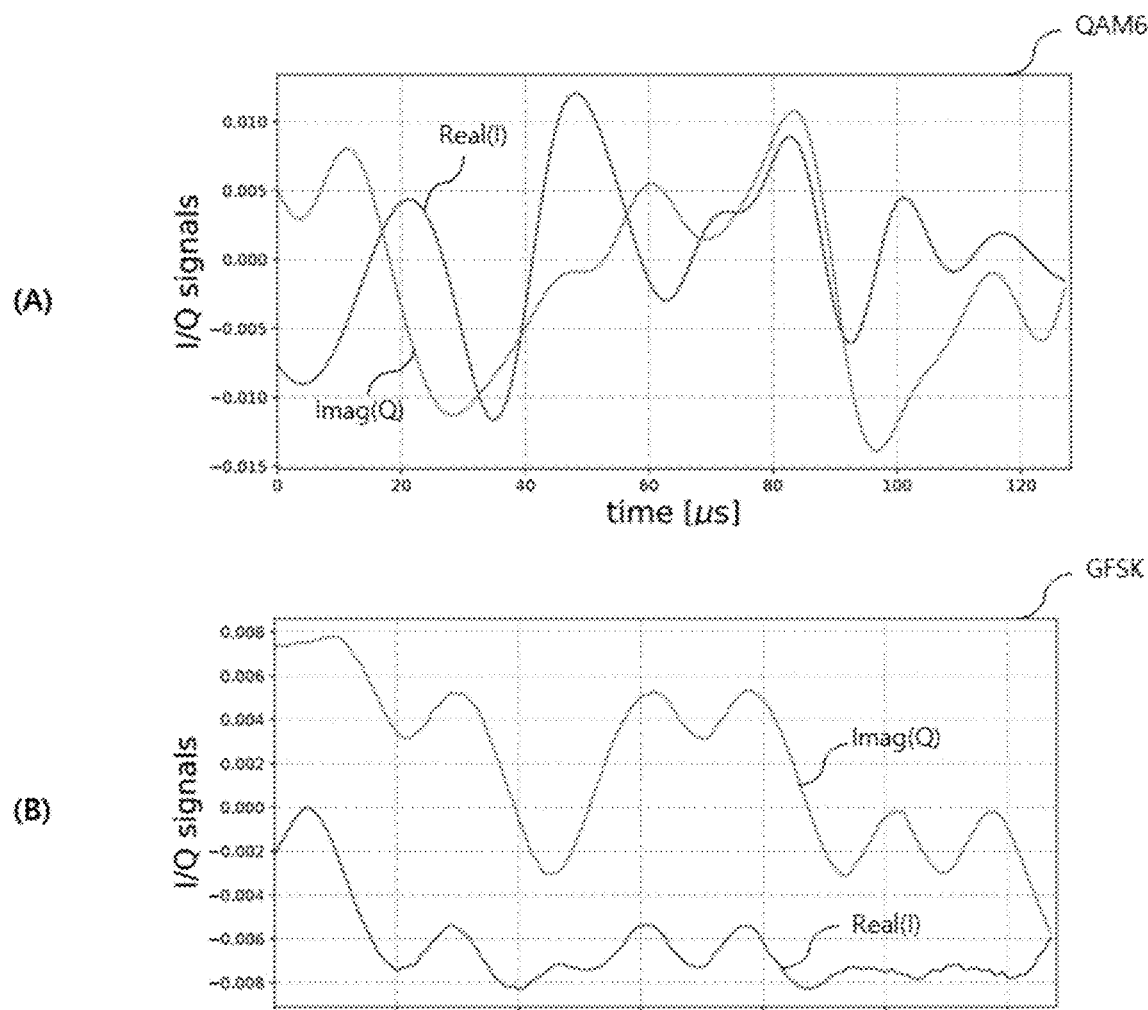
FIG. 2 is a view for illustratively explaining an I/Q signal pattern that appears differently depending on a modulation method.
Figure 6:
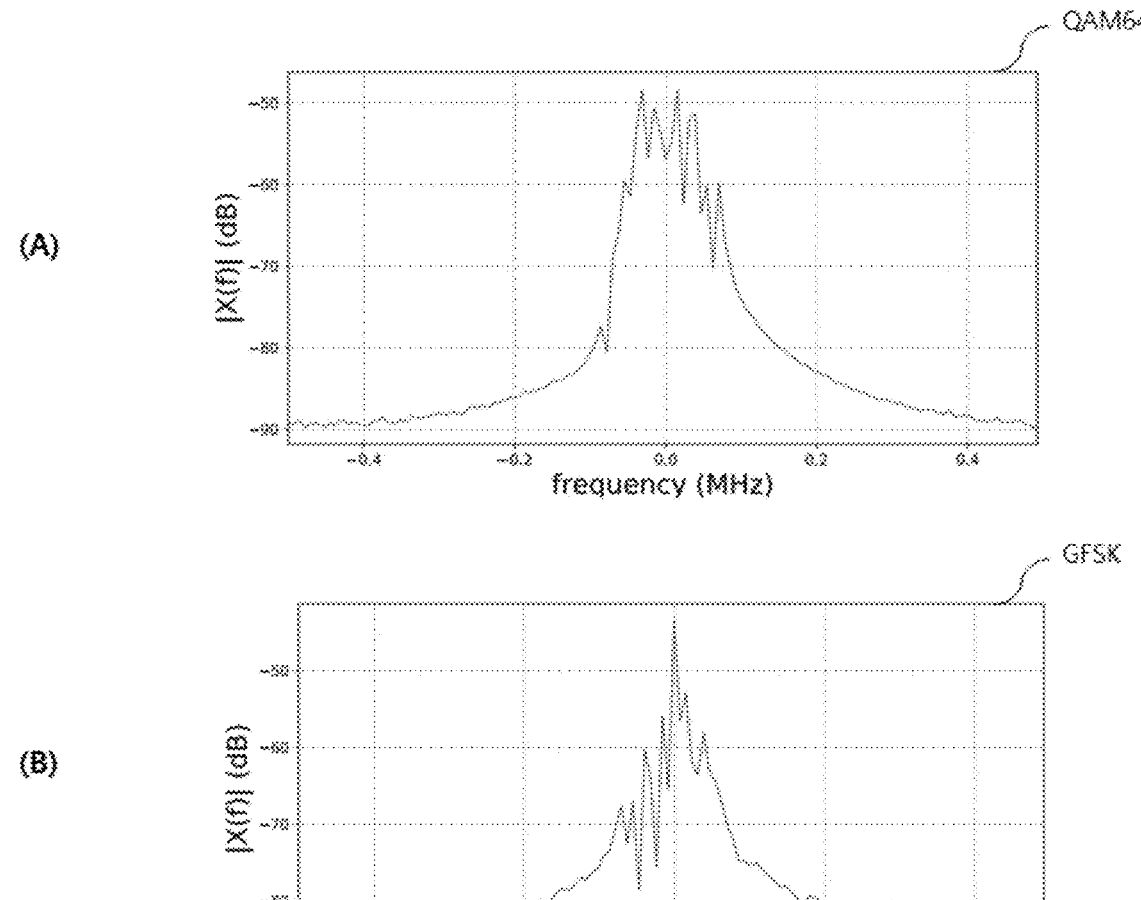
FIG. 6 is a view for exemplarily explaining a magnitude spectral pattern in a frequency domain that appears differently according to a modulation method.

FIG. 1 is a view for illustratively explaining a difference in bandwidth according to the type of a wireless signal, FIG. 2 is a view for illustratively explaining an I/Q signal pattern that appears differently depending on a modulation method, FIG. 3 is a view for illustratively explaining a constellation diagram pattern that appears differently depending on a modulation method, FIG. 4 is a view for exemplarily explaining an amplitude pattern in a time domain that appears differently depending on a modulation method, FIG. 5 is a view for illustratively explaining a phase pattern in a time domain that appears differently depending on a modulation method, and FIG. 6 is a view for exemplarily explaining a magnitude spectral pattern in a frequency domain that appears differently according to a modulation method.

With the recent rapid development of wireless communication and semiconductors, wireless communication technology has been applied not only to existing wireless communication devices such as smartphones and tablets, but also to home appliances, vehicles, and public facilities. Accordingly, the trend of coexistence of various wireless communication technologies within the same network and spectral band is accelerating.

As the number of devices using various wireless communication technologies increases, the possibility that interference and influence between devices frequently occurs in a multi-dimensional spectral space rather than a one-dimensional space is increasing.

Referring to Table 1 below, wireless communication technologies such as IEEE 802.11 (WiFi), IEEE 802.15.1 (Bluetooth), and IEEE 802.15.4 (Zigbee) are different from each other in a modulation method, frequency band, band and bandwidth, maximum power, data rate, and transmission range used. For example, as shown in FIG. 1, different wireless communication technologies have different bands and bandwidths. In addition, as shown in FIGS. 2 to 6, different wireless communication technologies have different features (I/Q signal pattern, constellation pattern, amplitude/phase pattern, magnitude pattern in a frequency domain, etc.) according to modulation methods.

TABLE 1

| | PHYSICAL | Max 1x Power | Spreading method/MAC | Modulation Type | Payload Length | Channel BW | IFS |
|---|---|---|---|---|---|---|---|
| WLAN | 802.11g | 100 mW (20 dBm) | OFDM/ CSMA/CA | BPSK, QPSK, 16-QAM, 64-QAM | 1-4,095 bytes (PSDULength) | CBW20 CBW40 | 16 μs |
| | 802.11n | 100 mW (20 dBm) | OFDM/ CSMA/CA | BPSK, QPSK, 16-QAM, 64-QAM | 1-65,535 bytes (PSDULength) | CBW20 CBW40 | 16 μs |
| | 802.11ex | 100 mW (20 dBm) | OFDM/ CSMA/CA | BPSK, QPSK, 16-QAM, 64-QAM, 256-QAM | 1-1,048,576 bytes (Limit 5.5 ms) | CBW20 CBW40 CBW80 CBW160 | 16 μs |

TABLE 1-continued

| | PHYSICAL | Max 1x Power | Spreading method/MAC | Modulation Type | Payload Length | Chanel BW | IFS |
|---|---|---|---|---|---|---|---|
| | 802.11ex | 100 mW (20 dBm) | OFDM/ CSMA/CA | BPSK, QPSK, 16-QAM, 64-QAM, 256-QAM, 1024-QAM | 1-6,451,651 bytes (Limit 5.5 ms) | CBW20 CBW40 CBW80 CBW160 | 16 μs |
| Bluetooth | Bluetooth BR/EDR (BR/EDR2M/ EDR3M) | Class 1: 100 mW (20 dBm)/ Class 2: 2.5 mW (4 dBm)/ Class 3: 1 mW (0 dBm) | FHSS | GFSK, DQPSK, DPSK | — | 79 channels (1 Mhz) | — |
| | BLE (LE125, LE500, LE1M, LE2M) | Class 1: 100 mW (20 dBm)/ Class 1.5: 10 mW (10 dBm)/ Class 2: 2.5 mW (4 dBm)/ Class 3: 1 mW (0 dBm) | PHSS° | GFSK | 1-251 bytes | 40 channels (2 Mhz) | 150 μs |
| Zigbee | 802.15.4 | 1 mW (0 dBm) | DSSS/ CSMA/CA | O-QPSK | 1-128 bytes | 16 channels (5 Mhz interval, 2 Mhz) | 150 μs |

A signal using a specific wireless communication technology leaves a footprint for the above features, and when the footprint of the signal is analyzed in an n-dimensional space, a path in which interference of wireless signals can be minimized and collision can be prevented may be selected.

Existing spectrum sensing technologies (hole detection, energy detection, preamble detection, etc.) for preventing the interference and collision support signal classification in a one-dimensional space or merely classify signals, and there is a limit to efficient path determination through spectral analysis in a multi-dimensional space.

Hereinafter, a wireless signal spectral analysis device and a wireless signal spectral analysis method using a multi-task learning-based spectral analysis learning model according to some embodiments and a method thereof will be described with reference to FIGS. 7 to 16.

Figure 7:
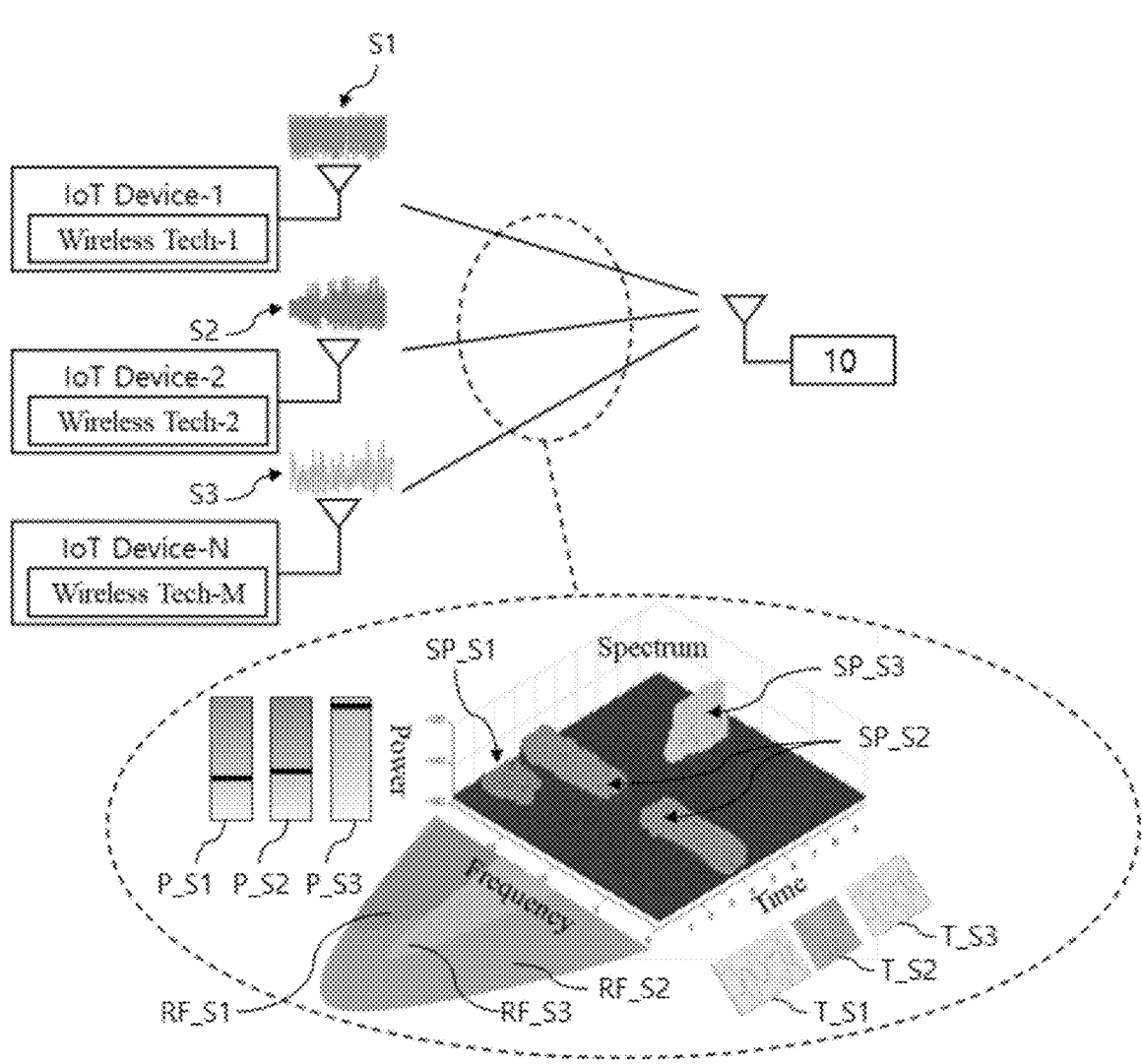
FIG. 7 is a view for conceptually explaining a multi-task learning-based wireless signal spectral analysis device according to some embodiments.

FIG. 7 is a view for conceptually explaining a multi-task learning-based wireless signal spectral analysis device according to some embodiments.

Referring to FIG. 7, the wireless signal spectral analysis device 10 according to an embodiment may obtain a plurality of signals S1, S2, and S3 emitted from a plurality of wireless communication devices, may perform learning to analyze a multi-dimensional spectrum of each of the signals S1, S2, S3, and may output analysis data through a trained learning model. For convenience of explanation, the wireless signal spectral analysis device 10 is illustrated as performing learning and analysis based on three wireless communication devices and three signals, but is not limited thereto. It is obvious that the wireless signal spectral analysis device 10 may learn by analyzing a plurality of wireless signals.

As shown, each of the plurality of wireless signals S1, S2, and S3 leaves a footprint including a feature in a multi-dimensional spectral space (time, frequency, power, space, etc.). The wireless signal spectral analysis device 10 according to some embodiments analyzes features in multiple dimensions, such as time (T_S1, T_S2, T_S3), power (P_S1, P_S2, P_S3), frequency (RF_S1, RF_S2, RF_S3), or space (operation SP_S1, SP_S2, SP_S3) of each signal through a multi-task learning-based learning model, and suggests a method for minimizing interference between wireless signals through this.

Figure 8:
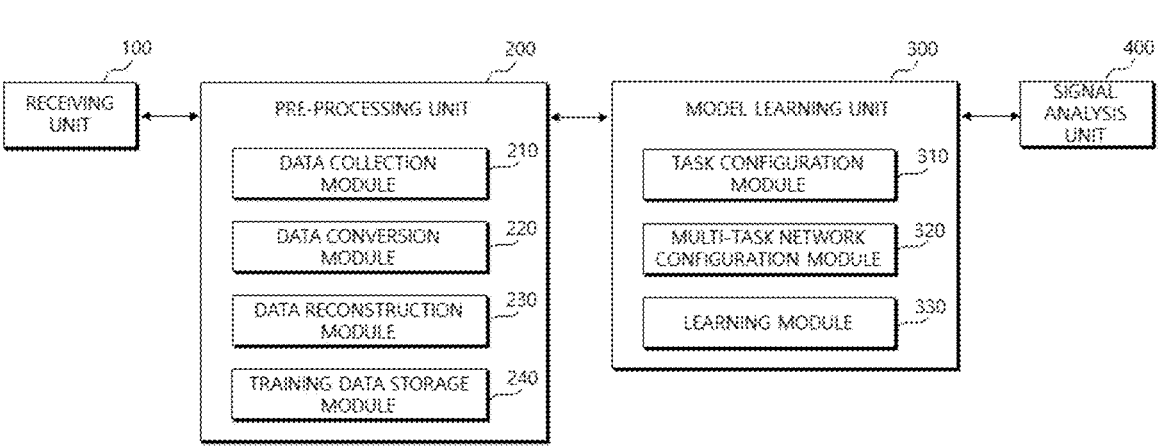
FIG. 8 is a view for explaining the configuration of a wireless signal spectral analysis device according to some embodiments.

FIG. 8 is a view for explaining the configuration of a wireless signal spectral analysis device according to some embodiments. Referring to FIG. 8, the wireless signal spectral analysis device 10 according to an embodiment may include a receiving unit 100, a pre-processing unit 200, a model learning unit 300, and a signal analysis unit 400.

The receiving unit 100 may detect and obtain a target signal emitted from a wireless communication device. Criteria for detecting the target signal may be determined as a space, a band, or the like, and of course, these criteria may be set and implemented in various ways according to the purpose of learning and analysis. In the present specification, a "target signal" may refer to a signal for which learning and analysis of a signal source is to be performed or a signal to be analyzed.

The pre-processing unit 200 may perform a pre-processing operation on the target signal obtained from the receiving unit 100. According to an embodiment, the pre-processing unit 200 may include a data collection module 210, a data conversion module 220, a data reconstruction module 230, and a training data storage module 240.

The data collection module 210 may collect a dataset for multi-task network training. For example, the initial dataset may be an In-phase/Quadrature (I/Q) sample.

The data conversion module 220 may convert the collected dataset into a dataset suitable for training as necessary. For example, the data conversion module 220 may convert the collected dataset into a dataset suitable for training through Fast Fourier Transform (FFT), Amplitude/Phase, Short Time Fourier Transform (operation STFT), or the like.

When a result of learning performed by the model learning unit 300 does not meet criteria, the data reconstruction module 230 may perform reconstruction of the dataset for re-learning. For example, the data reconstruction module 230 may reconstruct the dataset by adjusting the magnitude of the dataset, changing an n-point value of the FFT, changing a value of the Amplitude/Phase, changing the magnitude of the STFT, and the like.

The training data storage module 240 may store a signal dataset for multi-task network training. That is, the training data storage module 240 may store a dataset to be performed by the model learning unit 300. As another example, the training data storage module 240 may store data about a signal for which signal spectral analysis is to be performed using a trained learning model.

The model learning unit 300 may perform multi-task learning-based spectral analysis learning. According to an embodiment, the model learning unit 300 may include a task configuration module 310, a multi-task network configuration module 320, and a learning module 330.

According to an embodiment, the model learning unit 300 corresponds to a computing device having various processing functions, such as functions for generating a neural network, training (or learning) a neural network, or retraining a neural network. For example, the model learning unit 300 may be implemented with various types of devices such as a personal computer (PC), a server device, and a mobile device.

The model learning unit 300 may generate a trained neural network by repeatedly training (learning) a given initial neural network. Generating a trained neural network may mean determining neural network parameters. For example, the parameters may include various types of data input/output to/from the neural network, such as input/output activations, weights, and biases of the neural network. As iterative training of the neural network proceeds, the parameters of the neural network may be tuned to compute a more accurate output for a given input. The model learning unit 300 may transmit the trained neural network to the signal analysis unit 400.

The task configuration module 310 may configure a task to perform learning and analysis through a multi-task network. For example, the task configuration module 310 may select and configure at least two tasks from among tasks such as signal classification, modulation method classification, channel classification, power estimation, signal source position estimation, and signal position estimation in a spectrogram.

The multi-task network configuration module 320 may configure a network for performing multi-task learning-based learning by receiving input data. According to an embodiment, the multi-task network configuration module 320 may determine a shared layer by determining shared features according to tasks determined by the task configuration module 310, and may determine a task specific layer for performing each task.

The learning module 330 may perform spectral analysis learning based on the tasks and network configuration determined by the task configuration module 310 and the multi-task network configuration module 320. The network configuration, a learning operation, and the like will be described in detail with reference to FIG. 9 below.

The signal analysis unit 400 may analyze a target signal based on a learning model trained by the model learning unit 300. According to some embodiments, the signal analysis unit 400 may be included in a mobile device, an embedded device, or the like. The signal analysis unit 400 may be dedicated hardware for driving a neural network.

The signal analysis unit 400 may drive the trained neural network as it is, or drive a neural network generated by processing (e.g., quantizing) the trained neural network. The signal analysis unit 400 driving the processed neural network may be implemented in an independent device separate from the device of the model learning unit 300, but is not limited thereto. The signal analysis unit 400 may be implemented in the same device as that of the model learning unit 300.

Figure 9:
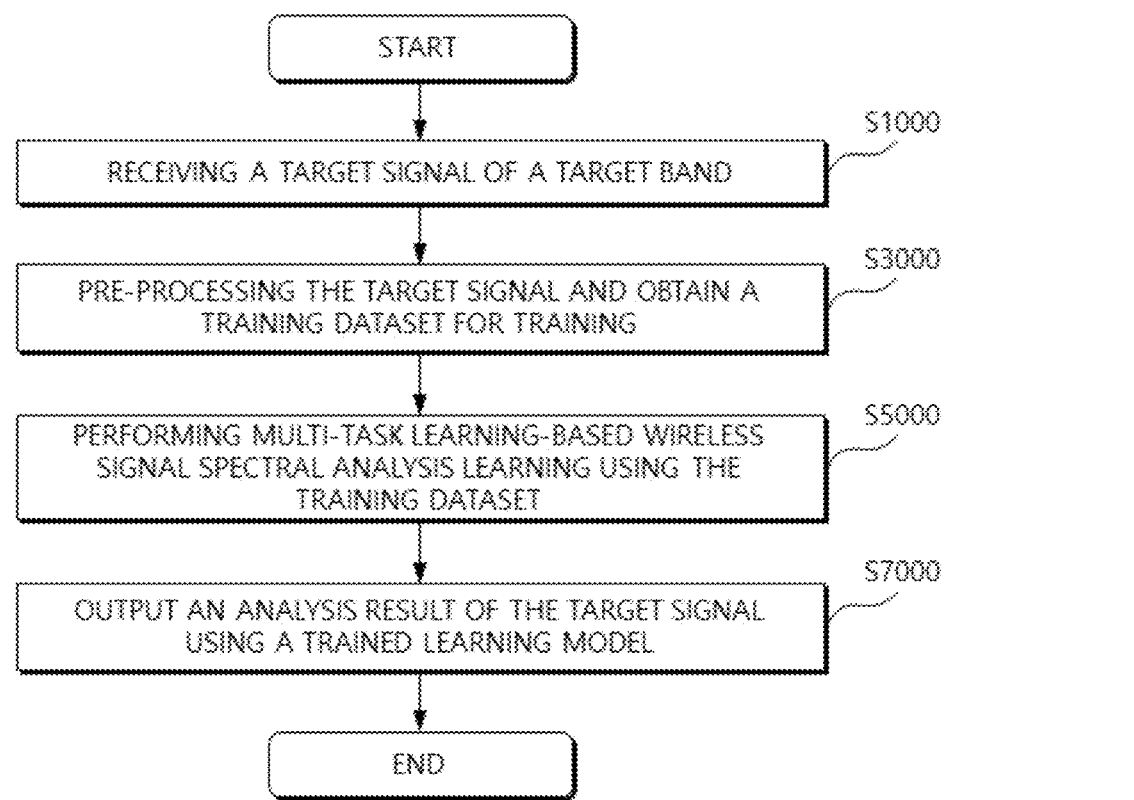
FIG. 9 is a view for explaining a wireless signal spectral analysis operation according to some embodiments.
Figure 10:
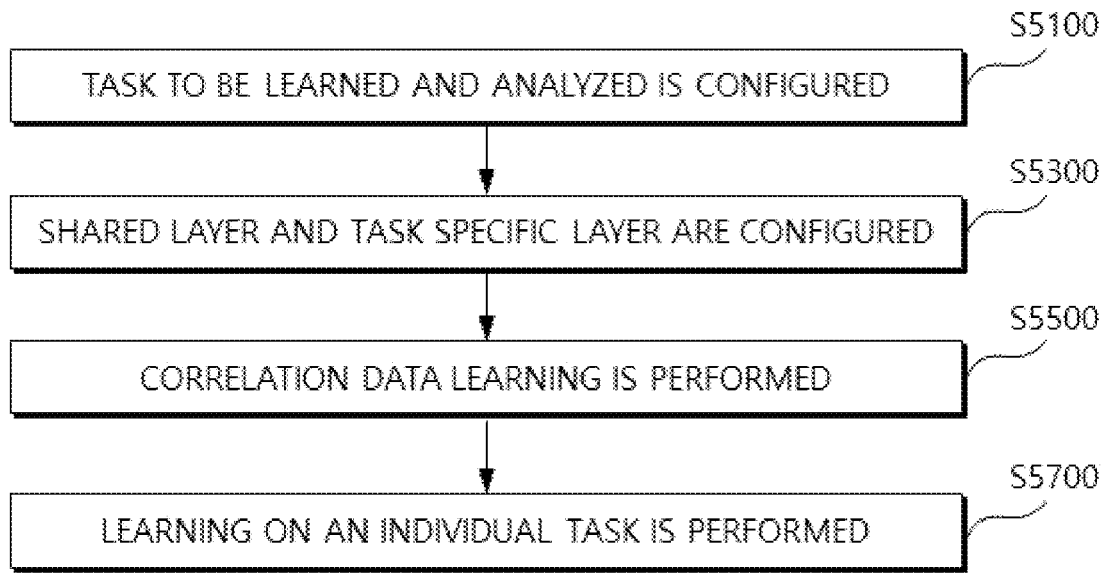
FIG. 10 is a view for explaining a wireless signal spectrum learning operation according to some embodiments.
Figure 11:
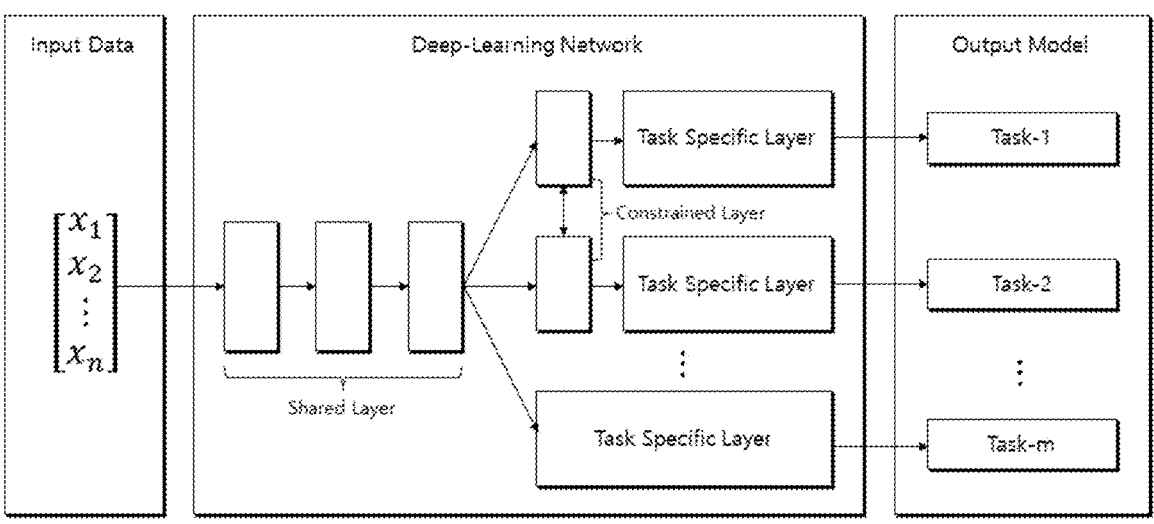
FIG. 11 is a view for conceptually explaining an operation of performing learning for a plurality of tasks through a multi-task learning-based deep learning network.

FIG. 9 is a view for explaining a wireless signal spectral analysis operation according to some embodiments, FIG. 10 is a view for explaining a wireless signal spectrum learning operation according to some embodiments, and FIG. 11 is a view for conceptually explaining an operation of performing learning for a plurality of tasks through a multi-task learning-based deep learning network, according to some embodiments.

Referring to FIGS. 9 to 11, the wireless signal spectral analysis device 10 according to an embodiment may perform wireless signal spectral analysis learning through a multi-task learning-based network, and may output an analysis result of a target signal based on this.

A wireless signal spectral analysis method using a multi-task learning-based spectral analysis learning model may receive a target signal of a target band, obtain a training dataset through pre-processing of the target signal, may perform wireless signal spectral analysis learning using the training dataset, and may analyze the target signal using a spectral analysis learning model.

According to an embodiment, the performing of wireless signal spectral analysis learning may include configuring task specific layers for respectively performing individual learning for a plurality of tasks to be analyzed and a shared layer for performing shared learning, learning, in the shared layer, correlation data that meets a predefined criterion in the training dataset, and individually learning, in each of the plurality of task specific layers, using an individual dataset required for each task in the training dataset and a result of learning the correlation data.

In operation S1000, the receiving unit 100 may receive a target signal of a target band.

In operation S3000, the pre-processing unit 200 may pre-process the target signal and obtain a training dataset for training.

In operation S5000, the model learning unit 300 may perform multi-task learning-based wireless signal spectral analysis learning using the training dataset.

In more detail, in operation S5100, a task to be learned and analyzed may be configured by the task configuration module 310. For example, the task may be composed of at least two tasks among tasks such as signal classification, modulation method classification, channel classification, power estimation, signal source position estimation, and signal position estimation in a spectrogram.

In operation S5300, a shared layer and a task specific layer may be configured by the multi-task network configuration module 320.

In operation S5500, correlation data learning may be performed by the learning module 330. As shown, correlation data learning is performed by the shared layer, and may be performed by hard sharing starting from an identical root model (identical input data) and performing each learning. That is, the shared layer may learn a feature shared by respective individual tasks. In this case, the shared feature may be correlation data between footprints of the signal source.

In operation S5700, learning on an individual task may be performed by the learning module 330. In this case, learning on an individual task may be performed in each task specific layer.

The task specific layer may include, for example, a Convolutional Neural Network (CNN), a Recurrent Neural Network (RNN), a Convolutional Recurrent Neural Network (CRNN), a Feed-Forward Neural Network (FNN), a Variational Auto Encoder (VAE), or the like.

In operation S7000, the signal analysis unit 400 may output an analysis result of the target signal using a trained learning model.

FIG. 12 is a view for explaining an operation of performing re-learning using a modified training dataset according to learning accuracy, according to some embodiments.

According to an embodiment, the training dataset may be composed of I/Q signal data. At this time, the performing of the wireless signal spectral analysis learning may include determining accuracy of the individual learning, obtaining a modified training dataset by performing FFT on the I/Q signal data when the accuracy is less than a predefined accuracy criterion, and performing the wireless signal spectral analysis learning using the modified training dataset.

According to an embodiment, the performing of the wireless signal spectral analysis learning may include changing the number of neurons in the shared layer to correspond to the modified training dataset, and performing learning using the changed shared layer and the plurality of task specific layers.

In more detail, referring to FIG. 12, the learning module 330 may determine accuracy of an individual task learning result in operation S5910, may perform FFT on I/Q signal data, which is training data, when the determined accuracy is less than a predefined criterion in operation S5930, may change the number of neurons in a shared layer to correspond to a modified training dataset that is a result of performing the FFT in operation S5950, and may perform re-learning using the changed shared layer and task specific layers in operation S5970.

That is, when the accuracy of each individual task does not reach an expected result due to problems such as generalization and optimization of a learning model, the learning module 330 may process (or convert) an existing dataset to generate a modified dataset, and perform re-learning based on the modified dataset. In addition, the learning module 330 may change and use a structure (the number of neurons, etc.) of the shared layer to correspond to the modified dataset.

Figure 14:
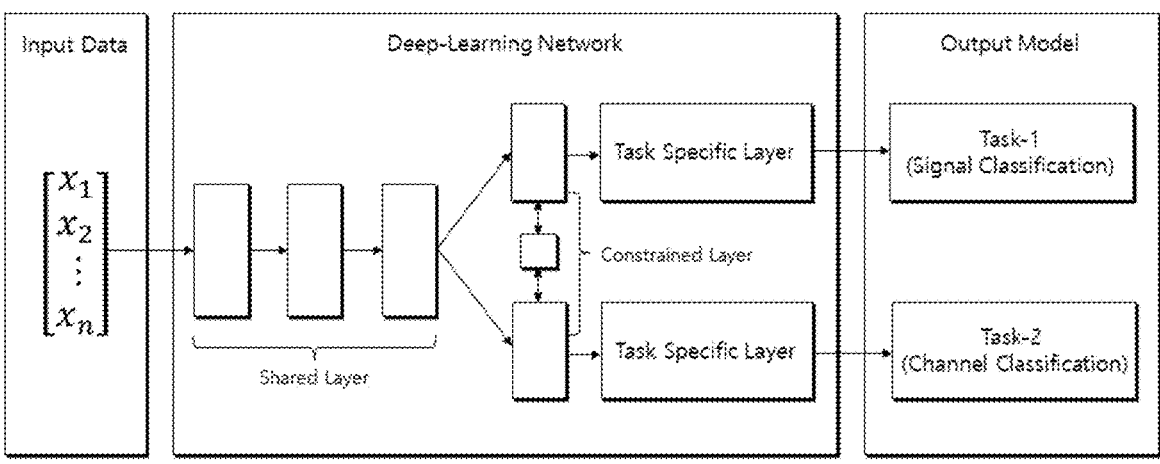

FIGS. 13 and 14 are views for explaining a learning operation for signal classification and channel classification tasks, according to some embodiments. Hereinafter, a description overlapping with the learning operation described above with reference to FIG. 10 will not be given herein.

According to an embodiment, the task specific layer may include a signal classification task layer for classifying signals of the target signal and a channel classification task layer for classifying channels of the target signal. The signal classification task layer performs individual learning based on I/Q data and constellation data in a time domain of the target signal, and the channel classification task layer may perform individual learning based on spectral density data of the target signal and amplitude data in the time domain. In this case, correlation data learned by the shared layer may include a bandwidth feature of the target signal.

In more detail, referring to FIGS. 13 and 14, in operation S5510, the task configuration module 310 may configure a signal classification task and a channel classification task as individual tasks.

In operation S5310, the multi-task network configuration module 320 may include a shared layer, a signal classification task layer, and a channel classification task layer. That is, a task specific layer may be configured as a signal classification task layer and a channel classification task layer.

In operation S5510, correlation data learning is performed by the shared layer, but the learned correlation data may be a bandwidth feature of a target signal.

In operation S5710, individual learning based on I/Q data and constellation data in a time domain of the target signal may be performed by the signal classification task layer. That is, a main feature for signal classification may be an I/Q value and a constellation, and accordingly, the signal classification task layer may learn the main feature.

In operation S5720, individual learning based on spectral density data of the target signal and amplitude data in the time domain may be performed by the channel classification task layer. That is, a main feature for channel classification may be spectral density and amplitude in the time domain, and accordingly, the channel classification task layer may learn the main feature.

Figure 15:
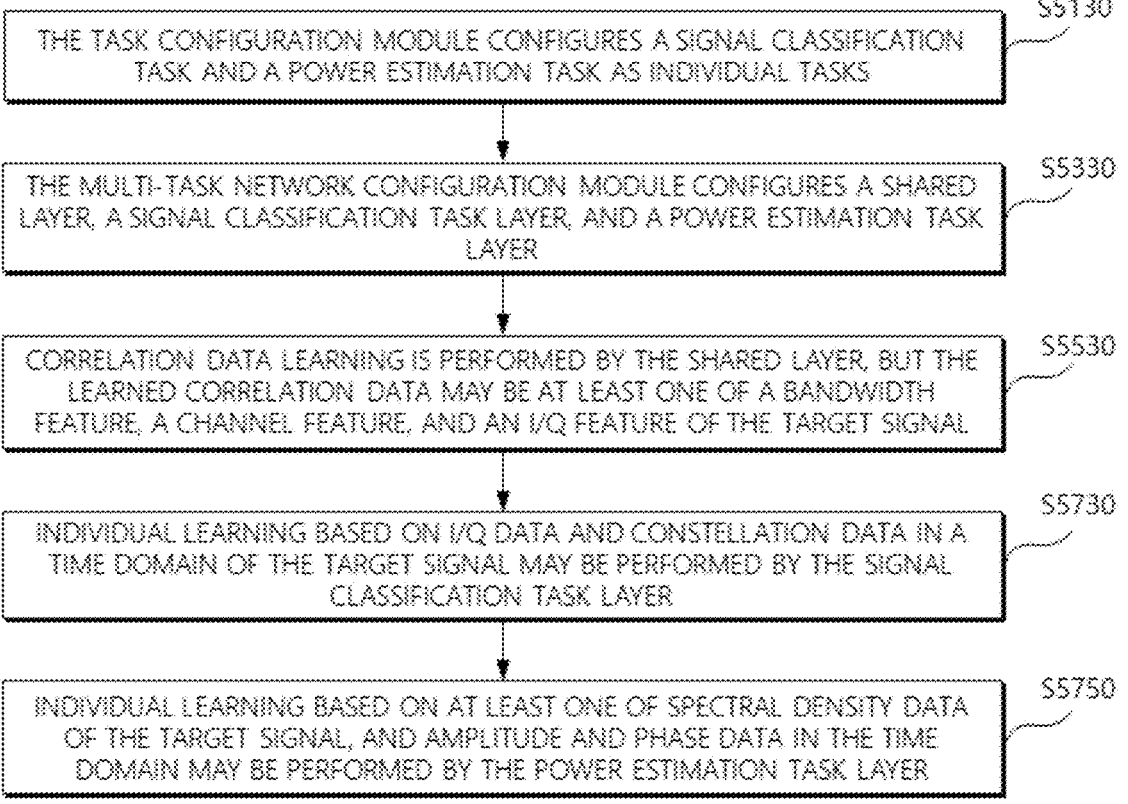
FIG. 15 and FIG. 16 are views for explaining a learning operation for signal classification and a power estimation task, according to some embodiments.
Figure 16:
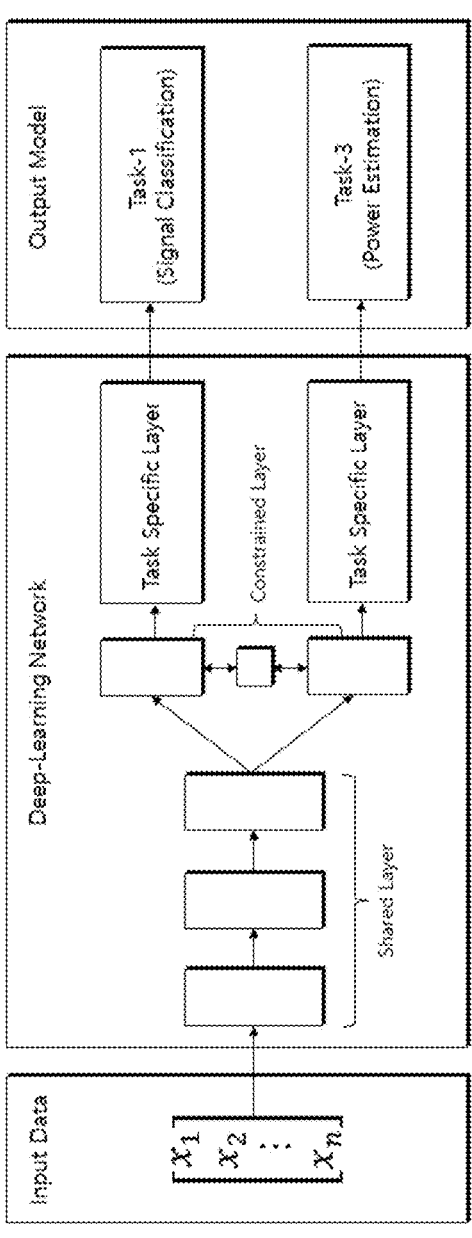

FIG. 15 and FIG. 16 are views for explaining a learning operation for signal classification and a power estimation task, according to some embodiments. Hereinafter, a description overlapping with the learning operation described above with reference to FIGS. 10, 13 and 14 will not be given herein.

According to an embodiment, the task specific layer may include a signal classification task layer for classifying signals of the target signal and a power estimation task layer for estimating the power of the target signal. The signal classification task layer performs individual learning based on I/Q data and constellation data in a time domain of the target signal, and the power estimation task layer may perform individual learning based on at least one of spectral density data of the target signal, and amplitude and phase data in the time domain. In this case, correlation data learned by the shared layer may include at least one of a bandwidth feature, a channel feature, and an I/Q feature of the target signal.

In more detail, referring to FIGS. 15 and 16, in operation S5130, the task configuration module 310 may configure a signal classification task and a power estimation task as individual tasks.

In operation S5330, the multi-task network configuration module 320 may include a shared layer, a signal classification task layer, and a power estimation task layer. That is, a task specific layer may be configured as a signal classification task layer and a power estimation task layer.

In operation S5530, correlation data learning is performed by the shared layer, but the learned correlation data may be at least one of a bandwidth feature, a channel feature, and an I/Q feature of the target signal.

In operation S5730, individual learning based on I/Q data and constellation data in a time domain of the target signal may be performed by the signal classification task layer. That is, a main feature for signal classification may be an I/Q value and a constellation, and accordingly, the signal classification task layer may learn the main feature.

In operation S5720, individual learning based on at least one of spectral density data of the target signal, and amplitude and phase data in the time domain may be performed by the power estimation task layer. That is, a main feature for power estimation may be spectral density, and amplitude and phase in the time domain, and accordingly, the channel classification task layer may learn the main feature.

According to some embodiments, a trained learning model enables comprehensive detection of a spectrum, which may support effective wireless communication interference mitigation, and spectrum monitoring and management.

In addition, a multi-task network may precisely detect a spectrum by learning features of wireless signals that affect a multi-dimensional spectral space.

In addition, by performing simultaneous learning on related tasks, high-performance spectrum detection may be performed even if a dataset for a signal source is insufficient.

In addition, by learning correlation between tasks and sharing it in an individual task, a shared layer of the multi-task network may accurately detect a spectrum despite RF defects (e.g., frequency offset error, timing drift, time offset error, phase offset error, DC offset error, signal noise, etc.) affecting a multi-dimensional spectral space.

In concluding the detailed description, those skilled in the art will appreciate that many variations and modifications may be made to the preferred embodiments without substantially departing from the principles of the present invention. Therefore, the disclosed preferred embodiments of the invention are used in a generic and descriptive sense only and not for purposes of limitation.

What is claimed is:

1. A wireless signal spectral analysis method using a multi-task learning-based spectral analysis learning model, the method comprising:

receiving a target signal of a target band, obtaining a training dataset through pre-processing of the target signal, performing wireless signal spectral analysis learning using the training dataset, and analyzing the target signal using a trained spectral analysis learning model, wherein the performing of wireless signal spectral analysis learning comprises:

configuring task specific layers for respectively performing individual learning for a plurality of tasks to be analyzed and a shared layer for performing shared learning;

learning, in the shared layer, correlation data that meets a predefined criterion in the training dataset; and individually learning, in each of the plurality of task specific layers, using an individual dataset required for each task in the training dataset and a result of learning the correlation data, wherein the plurality of task specific layers comprise:

a signal classification task layer configured to classify signals of the target signal, the signal classification task layer performing individual learning based on I/Q data and constellation data in a time domain of the target signal, and a task layer selected from the group consisting of:

a channel classification task layer, the channel classification task layer performing individual learning based on spectral density data of the target signal and amplitude data in the time domain; and a power estimation task layer, the power estimation task layer performing individual learning based on at least one of spectral density data of the target signal, and amplitude and phase data in the time domain.

2. The wireless signal spectral analysis method of claim 1, wherein the training dataset is composed of I/Q signal data, and the performing of the wireless signal spectral analysis learning comprises:

determining accuracy of the individual learning;

obtaining a modified training dataset by performing Fast Fourier Transform (FFT) on the I/Q signal data when the accuracy is less than a predefined accuracy criterion; and performing the wireless signal spectral analysis learning using the modified training dataset.

3. The wireless signal spectral analysis method of claim 2, wherein the performing of the wireless signal spectral analysis learning comprises:

changing the number of neurons in the shared layer to correspond to the modified training dataset; and performing learning using the changed shared layer and the plurality of task specific layers.

4. The wireless signal spectral analysis method of claim 1, wherein the task layer selected from the group consisting of the channel classification task layer and the power estimation task layer is the channel classification task layer.

5. The wireless signal spectral analysis method of claim 4, wherein the correlation data learned by the shared layer comprises a bandwidth feature of the target signal.

6. The wireless signal spectral analysis method of claim 1, wherein the task layer selected from the group consisting of the channel classification task layer and the power estimation task layer is the power estimation task layer.

7. The wireless signal spectral analysis method of claim 6, wherein the correlation data learned by the shared layer comprises at least one of a bandwidth feature, a channel feature, and an I/Q feature of the target signal.

* * * * *